(12) United States Patent
Eldemerdash et al.

(10) Patent No.: US 10,548,037 B2
(45) Date of Patent: Jan. 28, 2020

(54) SYSTEM AND METHOD FOR CELLULAR NETWORK IDENTIFICATION

(71) Applicant: Allen-Vanguard Corporation, Ottawa (CA)

(72) Inventors: Yahia Ahmed Eldemerdash, St. John's (CA); Octavia A. Dobre, St. John's (CA); Oktay Ureten, Ottawa (CA); Trevor Noel Yensen, Ottawa (CA)

(73) Assignee: Allen-Vanguard Corporation, Ottawa (CA)

( * ) Notice: Subject to any disclaimer, the term of this patent is extended or adjusted under 35 U.S.C. 154(b) by 0 days.

(21) Appl. No.: 15/687,370

(22) Filed: Aug. 25, 2017

(65) Prior Publication Data

US 2018/0063733 A1  Mar. 1, 2018

Related U.S. Application Data

(60) Provisional application No. 62/379,950, filed on Aug. 26, 2016.

(51) Int. Cl.
*H04W 24/08* (2009.01)
*H04J 13/16* (2011.01)
*H04W 48/18* (2009.01)
*H04W 84/04* (2009.01)

(52) U.S. Cl.
CPC .............. *H04W 24/08* (2013.01); *H04J 13/16* (2013.01); *H04W 48/18* (2013.01); *H04W 84/042* (2013.01)

(58) Field of Classification Search
CPC ..... H04W 24/00; H04W 24/06; H04W 24/08; H04W 48/16; H04W 48/18; H04W 84/042; H04W 16/18; H04W 16/22; H04J 11/0069; H04J 13/16; H04B 17/30
See application file for complete search history.

(56) References Cited

U.S. PATENT DOCUMENTS 7,400,903 B2  7/2008  Shoemake et al.
7,610,057 B2  10/2009 Bahl et al.
7,809,399 B2  5/2010  Lu et al.
(Continued)

FOREIGN PATENT DOCUMENTS

EP  1161043 B1  7/2005
EP  2432181 A1  3/2012
(Continued)

OTHER PUBLICATIONS

H. Li, Y. Bar-Ness, A. Abdi, 0. S. Somekh and W. Su, "OFDM-Modulation Classification and Parameters Extraction," 2006 1st International Conference on Cognitive Radio Oriented Wireless Networks and Communications, Mykonos Island, 2006, pp. 1-6. See Section III.
(Continued)

*Primary Examiner* — Afsar M Qureshi
(74) *Attorney, Agent, or Firm* — Elan IP Inc.

(57) ABSTRACT

A method for identifying cellular networks using a computer processor and a signal receiver including determining whether a cellular network being used is either an LTE-DL, LTE-UL, GSM, CDMA2000 or UMTS network. The determination is made on the basis of individual tests eliminating one network at a time based on unique characteristics of each particular network.

6 Claims, 11 Drawing Sheets

(56) References Cited

U.S. PATENT DOCUMENTS

| | | |
|---|---|---|
| 8,270,972 B2 | 9/2012 | Otting et al. |
| 8,798,006 B2 | 8/2014 | van den Berg et al. |
| 8,830,849 B2 | 9/2014 | Gaal et al. |
| 8,891,700 B1* | 11/2014 | Kim ............... H04B 1/1027 375/285 |
| 8,908,582 B2 | 12/2014 | Damnjanovic et al. |
| 9,001,682 B2 | 4/2015 | Kovvali et al. |
| 9,119,132 B2 | 8/2015 | Luo et al. |
| 9,241,302 B2 | 1/2016 | Ramachandran et al. |
| 2004/0081205 A1* | 4/2004 | Coulson ............ H04L 27/2656 370/503 |
| 2004/0091065 A1* | 5/2004 | Henttu ............... H04B 1/1027 375/317 |
| 2007/0167755 A1* | 7/2007 | Kolios ............... A61B 8/08 600/437 |
| 2012/0108206 A1 | 5/2012 | Haggerty |
| 2014/0146732 A1 | 5/2014 | Olufunmilola et al. |
| 2015/0063095 A1 | 3/2015 | Deng et al. |
| 2015/0296397 A1 | 10/2015 | Dural et al. |
| 2017/0155498 A1* | 6/2017 | Akande ............ H04L 5/0076 |
| 2018/0024981 A1* | 1/2018 | Xia .................. G06F 17/246 715/215 |

FOREIGN PATENT DOCUMENTS

| | | | |
|---|---|---|---|
| GB | 2409606 | * | 6/2005 |
| GB | 2409606 A | * | 6/2005 ............ H04W 48/18 |
| JP | 2007336078 | * | 6/2006 |
| JP | 2007336078 A | | 12/2007 |
| WO | 2009/072037 A2 | | 6/2009 |

OTHER PUBLICATIONS

W. A. Jerjawi, Y. A. Eldemerdash and 0. A. Dobre, Second-Order Cyclostationarity-Based Detection of L TE SC-FD MA Signals for Cognitive Radio Systems, 11 in IEEE Transactions on Instrumentation and Measurement, vol. 64, No. 3, pp. 823-833, Mar. 2015. See Sections IV.A an? IV.Band Fig. 3.

Zhang Tian-qi et al, "Recognition ofOFDM Signals in Multi-Path Fading Channels",..Journal of Beijing University of Posts and Telecommunications, vol. 35, pp. 74-78, Jun. 2012.

Hagiwara H and Nakagawa, M, "Automatic estimation of an input signal type", in Proc GLOBECOM-87, vol. 1, pp. 254-258, Nov. 15-18, 1987.

Baiqin Liu and K. C. Ho, Identification of CDMA signal and GSM signal using the wavelet transform, 11 42nd Midwest Symposium on Circuits and Systems (Cat. No. 99CH36356), Las Cruces, NM, 1999, pp. 678;.681 vol. 2 See second paragraph of Section I and Fig. I.

* cited by examiner

SYSTEM AND METHOD FOR CELLULAR NETWORK IDENTIFICATION

TECHNICAL FIELD

This invention relates generally to signal processing for wireless communication systems, and more particularly to a method and system for identifying signals from different cellular networks, such as GSM, CDMA2000, UMTS and LTE cellular networks.

BACKGROUND

Automatic signal identification (ASI) is an essential part of intelligent radios used in various military and commercial applications, such as electronic warfare, spectrum surveillance and software-defined and cognitive radios.

ASI algorithms can be categorized into two main classes: likelihood-based and feature-based. While the former algorithms provide the maximum average probability of correct identification, they are complex to implement and sensitive to model mismatches. On the other hand, feature-based algorithms are in general simpler to implement and robust to model mismatches. However, their performance is sub-optimal. In the prior art, feature-based algorithms have typically been used, and then only to identify standard signals and most of them concern the identification of a single standard signal (i.e., signal versus noise, also known as signal detection). For the identification of cellular standard signals versus other signals, second-order cyclostationarity-based features have been used to identify IEEE 802.11 standard signals, Long Term Evolution downlink (LTE-DL) versus WiMAX signals, GSM versus LTE-DL signals, and GSM versus CDMA and orthogonal frequency division multiplexing (OFDM) signals. A wavelet-based algorithm has been used to identify GSM versus CDMA signals, with GSM employing Gaussian minimum-shift-keying (GMSK) modulation and CDMA using offset quadrature phase-shift-keying. However, the prior art in general requires long observation intervals, which may not be available in certain applications. For example, only a small portion of the jamming interval is assigned for signal captures in reactive jamming in order not to degrade jamming performance, which leaves only short durations for signal identification.

Accordingly, there is a need for improved cellular network identifications methods and/or systems.

SUMMARY OF THE INVENTION

In one embodiment of the invention, there is disclosed a method for identifying cellular networks using a computer processor and a signal receiver comprising:

(i) applying a signal magnitude test to determine whether magnitude of observed cellular signal samples follows a predetermined distribution representative of LTE-DL (long term evolution downlink) signals; upon a condition in which the observed samples follows the predetermined distribution, outputting an indication that the signal is from an LTE-DL network and terminating the method;

(ii) applying a test to determine the presence of a cyclic prefix; upon a condition in which the presence of a cyclic prefix is detected, outputting an indication that the signal is from an LTE-UL (long term evolution uplink) network, and terminating the method;

(iii) applying a test to determine whether the signal samples have a constant envelope; upon a condition in which the signal samples have a constant envelope, outputting an indication that the signal is from a GSM network, and terminating the method;

(iv) applying a test to determine a signal bandwidth estimate to determine whether the signal samples are from CDMA2000 (code-division multiple access) or UMTS (universal mobile telecommunications system) networks; and outputting an indication of either the CDMA2000 or UMTS networks.

In one aspect of the first embodiment, the magnitude test is a Kolmogorov-Smirnov test, and wherein the predetermined distribution is a Rayleigh distribution.

In another aspect of the first embodiment, the test to determine the presence of a cyclic prefix is a second-order one-conjugate correlation test.

In another aspect of the first embodiment, the test to determine whether the signal samples have a constant envelope is a one-sample Kolmogorov-Smirnov test.

In another aspect of the first embodiment, a bandwidth of 1.25 MHz is used to indicate the CDMA2000 network and a bandwidth of 5 MHz is used to indicate the UMTS network.

In a second embodiment of the invention, there is provided a method for identifying cellular networks using a computer processor and a signal receiver including:

(i) applying a test to determine whether observed cellular signal samples have a constant amplitude; upon a condition in which the observed samples have a constant amplitude, outputting an indication that the signal is from a GSM network;

(ii) applying a test to determine the presence of a cyclic prefix; upon a condition in which the presence of a cyclic prefix is detected, determining a peak to average power ratio of the signal; wherein a high peak to average power ratio is indicative of an LTE-DL signal and a low peak to average power ratio is indicative of an LTE-UL signal; and outputting a corresponding indication of either the signal is from either an LTE-DL or LTE-UL network;

(iii) applying a test to determine a signal bandwidth estimate to determine whether the signal samples are from CDMA2000 (code-division multiple access) or W-CDMA networks; and outputting an indication of either the CDMA2000 or W-CDMA networks.

In a third embodiment of the invention, there is disclosed a system for identifying cellular networks including a signal receiver configured to receive a cellular signal and a a computer processor configured to receive data corresponding to the cellular signal and to carry out the method of either the first or second embodiments.

BRIEF DESCRIPTION OF THE DRAWINGS

The invention is illustrated in the figures of the accompanying drawings which are meant to be exemplary and not limiting, in which like references are intended to refer to like or corresponding parts. Acronyms used in the description of the drawings are expanded upon in the description. Below is a listing of the drawings.

DETAILED DESCRIPTION OF THE INVENTION

A practical example of the invention resides in its ability to improve the efficiency of a jammer. While a traditional blind signal jammer uses a noise-like signal to neutralize all types of threats, a more efficient waveform can be designed if the target signal is known. This requires the jamming system to have sensing capabilities for identifying the type of the target signal and adapt the jamming waveform accordingly. For example, in advanced electronic attack (EA), a jammer can synchronize to the threat network and transmit a specialized waveform for that practical network type to defeat the threats more affectively. However, this type of attack requires the knowledge of the network type, which may not be known a priori in ad hoc deployments, as different cellular network technologies can exist in the same frequency bands at different geographical locations. Our invention does not rely on contiguous sample captures for signal identification. In the state of the art of signal identification, as outlined in documents such as ITU-R SM. 1600-1, "Technical identification of digital signals", it is custom to use correlation based techniques where received signal is correlated with known preambles embedded within the transmitted burst to detect/identify signals. However, these preamble signals are only transmitted during a small portion of longer bursts. If the receiver is only capturing small signal segments separated by longer intervals where there is no signal acquisition, it is very likely that the receiver will not capture preambles, and state-of-art techniques based on correlation will fail to identify the signal. Our technique does not rely on a priori preamble knowledge; therefore it is immune to interrupted data acquisition problem.

In this invention, feature-based approaches are developed to identify cellular networks. In particular, the following identification features are employed.

The cumulative distribution function (CDF) of the magnitude of the observed samples provides a significant identification feature for the GSM and LTE-DL networks. One-sample and two-samples Kolmogorov-Smirnov (KS) tests can be used as decision criteria in different embodiments of the invention.

The signal bandwidth is used to differentiate between cdma2000 and UMTS signals, i.e., signals from wide-band code division multiple access (WCDMA) networks in one embodiment of the system.

Peak-to-average power ratio is used to differentiate between LTE-UL and LTE-DL signals. The existence of cyclic prefix (CP) is exploited to differentiate between CDMA and OFDM type modulations to identify LTE and CDMA2000/W-CDMA systems.

In the present invention, there is disclosed a general identification method that can be implemented on intelligent radio devices to identify LTE, UMTS, GSM, and CDMA2000 networks. Novel identification features based on the statistics and the structure in time and frequency domain of the candidate signals are disclosed. The cumulative distribution function (CDF) of the magnitude of the observed samples is employed as an identification feature for the LTE-DL and GSM signals, and the decision criterion is designed based on the Kolmogorov-Smirnov (K-S) test. Furthermore, the presence of the cyclic prefix (CP) and the signal bandwidth is exploited to identify the LTE uplink (LTE-UL), and UMTS versus CDMA2000 signals, respectively. The method is extended to efficiently work under frequency-selective fading conditions by considering multiple non-contiguous observations and combining the extracted identification features from these observations.

The proposed identification method is intended for intelligent radios with a single receive antenna. The radio can be implemented in a reactive jammer device or a receiver in a heterogeneous network, where the cellular network type in a given channel needs to be identified. The general model used in this invention for the received signal is $y_n = x_n + w_n$, $n=0, 1, \ldots, N-1$, where $x_n$ represents the transmitted signal which belongs to either LTE-DL, GSM, LTE-UL, UMTS, or CDMA2000 networks, N is the number of observed samples, and $w_n$ is the complex additive white Gaussian noise (AWGN) with zero-mean and variance $\sigma_w^2$.

Figure 1:
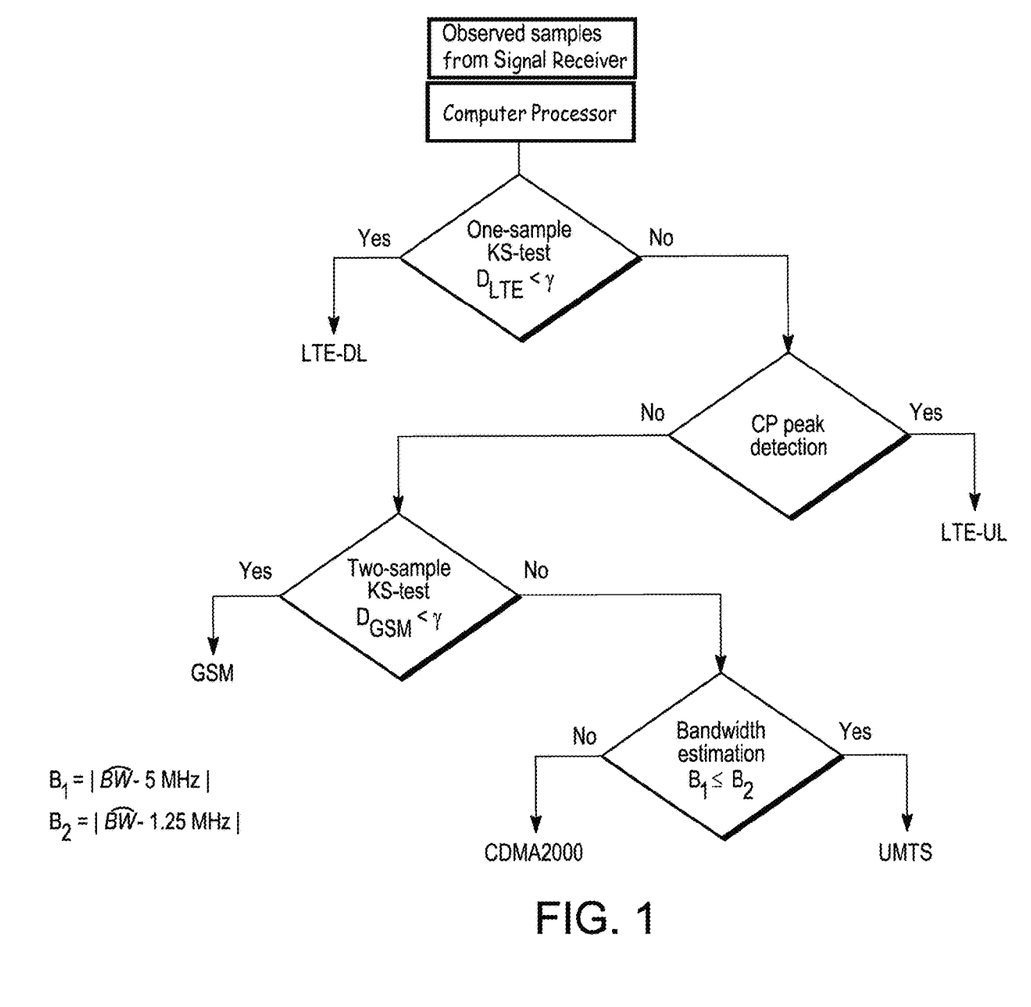
FIG. 1 shows a decision tree for the cellular network identification method in one embodiment of the invention.

FIG. 1 summarizes the four stages for the proposed cellular network identification method. In Stage 1, the one-sample K-S test is applied to check whether the magnitude of the observed samples follows a Rayleigh distribution, which is a unique feature of the LTE-DL signal versus the other signals under investigation. If the magnitude of the observed samples does not follow a Rayleigh distribution, the second-order one-conjugate correlation test is applied in Stage 2 to detect the presence of the CP. The LTE-UL network is selected if a significant peak is detected at delay corresponding to the useful time duration of the single-carrier frequency division multiple access (SC-FDMA) block, $T_u = 66.67$ μs. In the absence of such a peak, the one-sample K-S test is applied in Stage 3 to check if the received samples have a constant envelope, which represents a characteristic feature for the GSM signal. Finally, if no such feature is exhibited, the signal bandwidth estimate is used in Stage 4 to decide whether the observed samples belong to CDMA2000 or UMTS networks. Note that the design of the proposed method and the choice of the identification feature at each stage is done as shown in FIG. 1, in order to avoid the use of common features. For example, at Stage 1, we employ a unique feature of the LTE-DL before applying the CP detection at Stage 2, which is a common feature of the LTE-DL and LTE-UL signals. A detailed description of each stage now follows.

Stage 1: Identification of LTE-DL

OFDM modulation is employed for the LTE-DL signal, and thus, based on the central limit theorem, the LTE-DL signal has a complex zero-mean Gaussian distribution.

Hence, the magnitude of the LTE-DL signal, $z_n=|y_n|$, follows a Rayleigh distribution with the CDF expressed as $F^{(LTE)}(z)=1-\exp(-z^2/\sigma_y^2)$, where $\sigma_y^2$ is the variance of the received signal. Note that $\sigma_y^2$ y can be estimated from the observed samples as $$\hat{\sigma}_y^2 = \left(\frac{1}{N}\right)\sum_{n=0}^{N-1}|y_n|^2.$$

The identification of the LTE-DL signal relies on checking whether the empirical CDF of the magnitude of the observed samples, $z_n$, n=0, 1, ..., N−1, follows the Rayleigh CDF. This can be done using the one-sample K-S test, which is a nonparametric goodness of fit test used to approve the null hypothesis that two data populations are drawn from the same distribution to a certain level of significance. Failing to approve the null hypothesis indicates that the two data populations follow different distributions. The hypothesized CDF of the magnitude of the LTE-DL signal can be calculated from the observed samples. As such, the one-sample K-S test can be used to identify the LTE-DL based on the test statistic $D^{(LTE)}=\max_{z_n}|\hat{F}_1(z_n))-F^{(LTE)}(z_n))|$, where $\hat{F}_1(z_n))$ is the empirical CDF calculated from the observed samples. If $D^{(LTE)}<\gamma$, where $\gamma$ is a predetermined threshold, the signal located in the target frequency band is decided to be LTE-DL.

It is worth mentioning that as the identification of the LTE-DL relies on the CDF of the magnitude of the observed samples, the carrier frequency offset does not affect the identification feature. Moreover, any delay in the observed samples does not affect the distribution of the magnitude of the signal. Accordingly, the identification of the LTE-DL signal is robust to carrier frequency and timing offsets.

Stage 2: Identification of LTE-UL

SC-FDMA is used for the UL transmission in LTE networks. For SC-FDMA, a CP of length ν is added to each transmitted block by appending the last ν samples as a prefix. This feature is used to identify the LTE-UL signals. To this end, we employ the second-order one-conjugate correlation $R_c(\tau)=E\{y_n y_{n+\tau}^*\}$ to detect the CP in the observed samples, where $E\{\cdot\}$ and * denote the statistical expectation and complex conjugate, respectively. The correlation $R_c(\tau)$ is estimated as $$\hat{R}_c(\tau) = \frac{1}{N}\sum_{n=0}^{N-1} y_n y_{n+\tau}^*. \quad (1)$$

Figure 2:
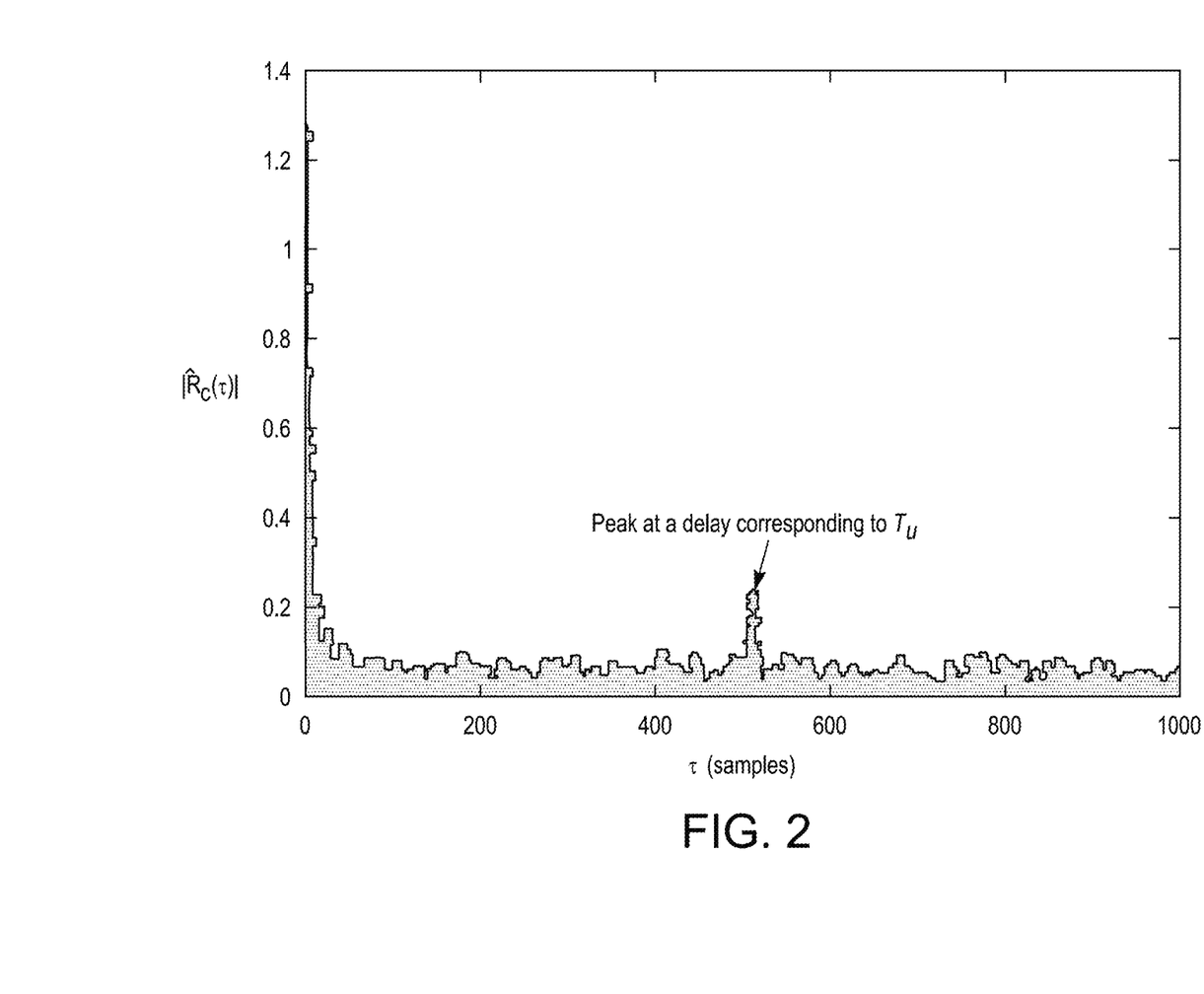
FIG. 2 shows the absolute value of the measured second-order zero-conjugate function for the SC-FDMA signal as determined during the identification of an LTE-UL signal.

In the presence of the CP, $|\hat{R}_c(\tau)|$ exhibits a peak at a delay corresponding to the useful symbol duration, $T_u$, i.e., $\tau_p=\rho N_c$, where $\rho$ is the oversampling factor and $N_c$ is the number of subcarriers. Therefore, the presence of such a peak indicates that the cellular network within the target band is LTE-UL. FIG. 2 shows the absolute value of the measured second-order zero-conjugate correlation function $|\hat{R}_c(\tau)|$ for the SC-FDMA signal with N=4000, $N_c$=128, $\rho$=4, and long CP, i.e., ν=$N_c$/4, over AWGN channel at SNR=6 dB.

Note that $R_c(\tau>>\tau_p)$ is theoretically zero when N→∞. However, with a limited number of observed samples N, its value is nonzero and represents the estimation error.

Such an error has an asymptotic zero-mean complex Gaussian distribution with variance $\sigma_e^2$. Accordingly, the normalized correlation function $\bar{R}(\tau)=(2/\sigma_e^2)^{1/2}\hat{R}_c(\tau)$, $\tau>>\tau_p$, follows a zero-mean complex Gaussian distribution with variance equal to two; hence, $|\bar{R}(\tau)|$, $\tau>>\tau_p$, has a chi-square distribution with two degrees of freedom. Accordingly, we define the test statistic, $\Gamma$ as $\Gamma=2/\hat{\sigma}_e^2|\hat{R}_c(\tau_p)|^2$, with $\hat{\sigma}_e^2=1/\Omega$, $\Sigma_{\tau>>\tau_p}|\hat{R}_c(\tau)|^2$, where $\Omega$ is the cardinality of the set of considered delays $\tau>>\tau_p$.

Furthermore, if $\Gamma\geq\eta$, the LTE-UL network is decided to be present in the target frequency band. The threshold $\eta$ corresponds to the desired probability of false alarm, $P_{fa}$=Pr($\Gamma\geq\eta$|LTE network is not present). Based on the CDF expression of the chi-square distribution with two degrees of freedom, $\eta=-2\ln P_{fa}$.

Note that as the identification of LTE-UL depends on the magnitude $|R_c(\tau)|$ at a certain delay, $\tau_p$, its identification is robust to carrier frequency and timing offsets.

Stage 3: Identification of GSM

The GMSK modulation is inherited in the GSM signal; as such, the transmitted signal, $x_n$, has a constant envelope, $|x_n|=A$ $\forall$n, where A is a positive constant. Given that $w_n \sim N_c(0, \sigma_w^2)$, the magnitude of the received GSM signal, $z_n=|A+w_n|$ follows a Rician distribution whose CDF is expressed as $F^{(GSM)}(z)=1-Q_1((\sqrt{2}|A|/\sigma_w), (\sqrt{2}z/\sigma_w))$, where $Q1(\bullet,\bullet)$ is the Marcum-Q function.

Similar to LTE-DL, the identification of the GSM signal relies on checking whether the empirical CDF of the magnitude of the observed samples, $z_n$, n=0, 1, ..., N−1, follows the Rician CDF. Given the GSM signal amplitude, A, and the noise variance, $\sigma_w^2$, the one-sample K-S test can be applied to identify the GSM signal; in practice, these two parameters need to be estimated. The GSM signal amplitude can be estimated as $\hat{A}=(1/N)\Sigma_{n=0}^{N-1}z_n$. Furthermore, the variance SW can be estimated as $\hat{\sigma}_w^2=(2/N)\Sigma_{n=0}^{N-1}|z_n-\hat{A}|^2$.

Figure 3:
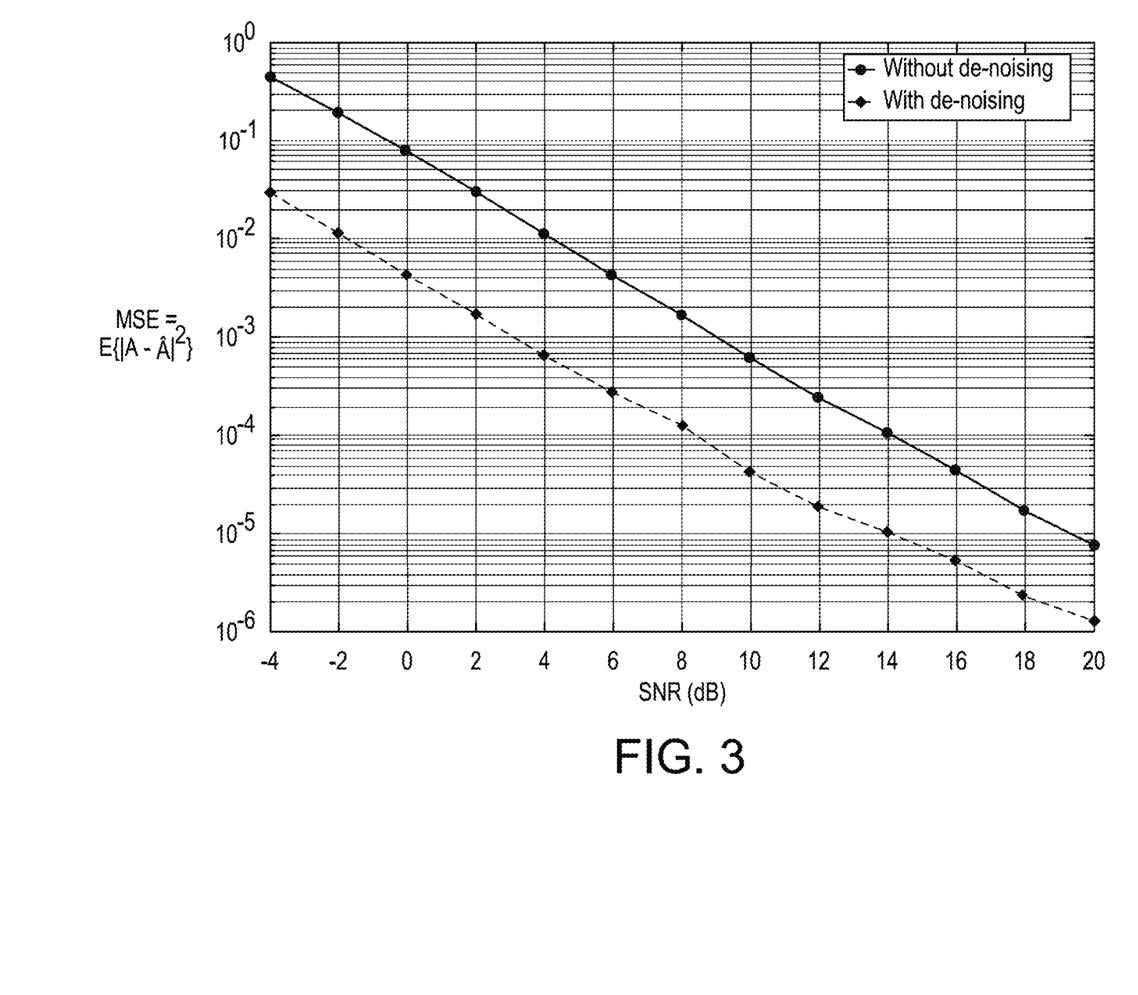
FIG. 3 shows the mean square error with and without applying the wavelet-based denoising algorithm used in identifying a GSM signal.
Figure 4:
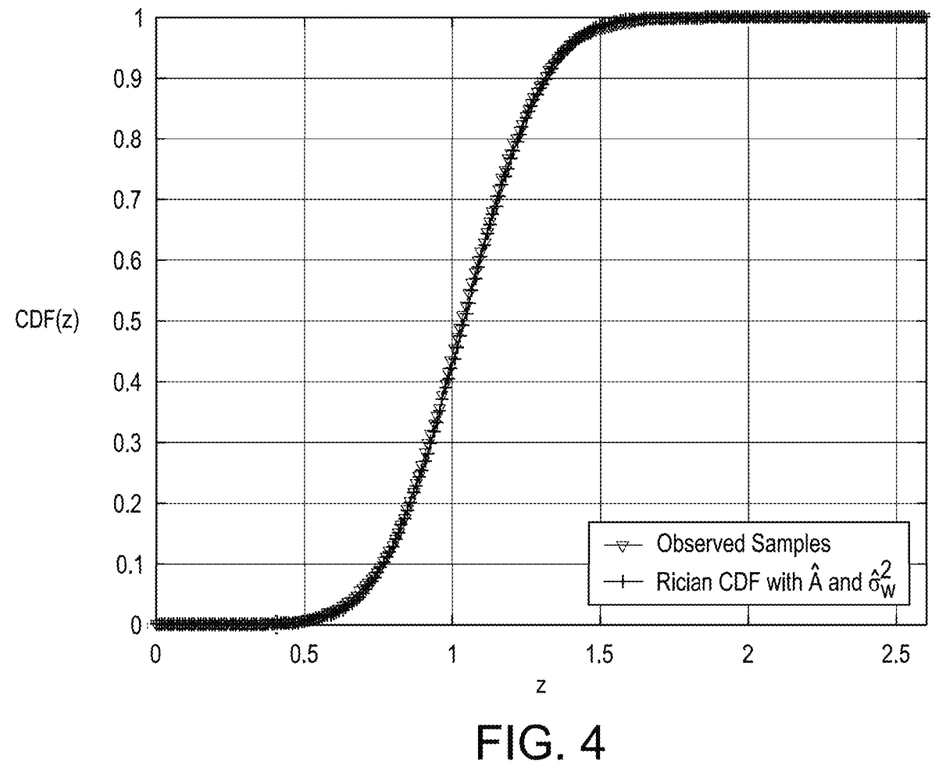
FIG. 4 shows the CDF of the observed samples and the Rician CDF with estimated parameters.

For a more accurate estimate of A, a wavelet-based denoising algorithm is applied to the observed samples, $y_n$, before calculating A. This can be done by applying a wavelet transform to the observed samples, zeroing all the resulting wavelet coefficients below a predetermined threshold, and finally applying an inverse wavelet transform process to obtain the denoised signal. FIG. 3 shows the mean square error (MSE) of $\hat{A}$, i.e., MSE=E$\{|A-\hat{A}|^2\}$, with and without using the denoising algorithm. Additionally, FIG. 4 shows the CDF for the observed samples and the Rician CDF with the estimated parameters, $\hat{A}$ and $\hat{\sigma}_w^2$, with N=8000 and at SNR=10 dB. Now, the test statistic $D(GSM)=\max_{z_n}|\hat{F}_1(z_n))-\hat{F}^{(GSM)}(z_n))|$ is used to identify the GSM network. If $D^{(GSM)}<\gamma$, where $\gamma$ is a predetermined threshold, the signal is decided to be GSM.

Similar to the LTE-DL identification, the CDF of the magnitude of the observed samples is employed to identify the GSM signal. Therefore, the identification of the GSM signal is also robust to carrier frequency and timing offsets.

Stage 4: Identification of UMTS and CDMA2000

The UMTS and CDMA2000 signals are both generated using direct sequence spread spectrum, and the signal bandwidth represents the main difference between the two networks, i.e., a bandwidth of 1.25 MHz is used for CDMA2000, whereas 5-MHz bandwidth is assigned to UMTS. This means that by estimating the signal bandwidth, we can differentiate between the UMTS and CDMA2000 signals. We employ the Welch's method to estimate the power spectral density of the observed samples. This is done by splitting the observed samples into overlapping segments and applying windowing and fast Fourier transform on each segment. The power spectral density is calculated on each segment, with the average being the estimated power spectral density of the observed samples. The estimated signal bandwidth, BW, is calculated from the estimated power spectral density as the difference in frequency between the points where the integrated power crosses 0.5% and 99.5% of the total power in the spectrum. If |BW−1.25 MHz|>|BW−5 MHz|, then UMTS is selected; otherwise, CDMA2000 is identified as the observed cellular network. Note that the carrier frequency and timing offsets do not affect the estimation of the signal bandwidth. As such, the identification of the UMTS and CDMA2000 signals is robust to such impairments.

Identification in Fading Conditions with Noncontiguous Intervals

In practice, it is possible that $N_B$ noncontiguous observation intervals are available to be used for identification, which can be beneficial under fading conditions. Each observed interval contains N samples, which are considered to experience independent fading. In such a case, the identification features are combined as follows.

For the GSM and LTE-DL signals, the K-S test is applied on N samples at each observed interval. The majority rule is applied to decide on the selected cellular network. For example, if $D^{(LTE)}<\gamma$ for more than $N_B/2$ intervals, the LTE-DL is decided to be the signal located within the target frequency band. The same process is applied to identify the GSM signal.

For the identification of the LTE-UL signal, the second-order zero-conjugate correlation is estimated over each interval and the test statistics on each observation interval, $\Gamma^b$, b=0, 1, 2, ..., Nβ−1 are combined as $\Gamma=\Sigma_{b=0}^{N_B-1}\Gamma^b$. If $\Gamma\geq\eta$, then the present signal is LTE-UL. Note that the null hypothesis in this scenario has a chi-square distribution with the degree of freedom equal to $2N_B$, and the threshold η is set based on that distribution and the desired $P_{fa}$.

For the identification of the UMTS and CDMA2000 signals, the estimated power spectral density is averaged over the observed intervals; then, the signal bandwidth is estimated based on this average.

Experimental Results

Measurement Setup

The proposed method is evaluated using frequency division duplex standard cellular signals generated by a Rohde&Schwarz (R&S) SMU200A vector signal generator and acquired with an R&S FSQ8 signal analyzer. The waveform generator and signal analyzer are not synchronized; therefore, the captured samples are affected by unknown timing and frequency offsets. Acquired signals are captured from the IF output of the signal analyzer and then transferred to a personal computer over the Ethernet, where the identification process is done using MATLAB. The AWGN and ITU-R vehicular A channels are considered to evaluate the performance of the identification method. The maximum delay spread for the ITU-R vehicular A channel is set to 2.51 μs. The maximum Doppler frequency is set to 145.69 Hz. The average energy of the received samples is normalized to unity, and the SNR is defined as SNR=10 $\log_{10}(1/\sigma_w^2)$, where $\sigma_w^2$ represents the variance of the noise samples. Unless otherwise mentioned, the number of observed samples, N, is 4000, the level of significance used with the K-S test is β=0.999, and the probability of false alarm, $P^{fa}$, is $10^{-3}$. Three different sets of candidate signals are considered: $\Sigma_1$={LTE-DL,UMTS}, $\Theta_2$={LTE-DL, UMTS,CDMA2000}, and $\Theta_3$={LTE-DL,UMTS, CDMA2000,GSM, LTE-UL}. Unless otherwise mentioned, the LTE-DL and LTE-UL signals with a bandwidth of 1.4 MHz, i.e., 128 subcarriers, are used. The percentage of the correct identification is used as a figure of merit, and calculated based on 1000 Monte Carlo trials.

Method Validation Under AWGN Channel

Figure 5:
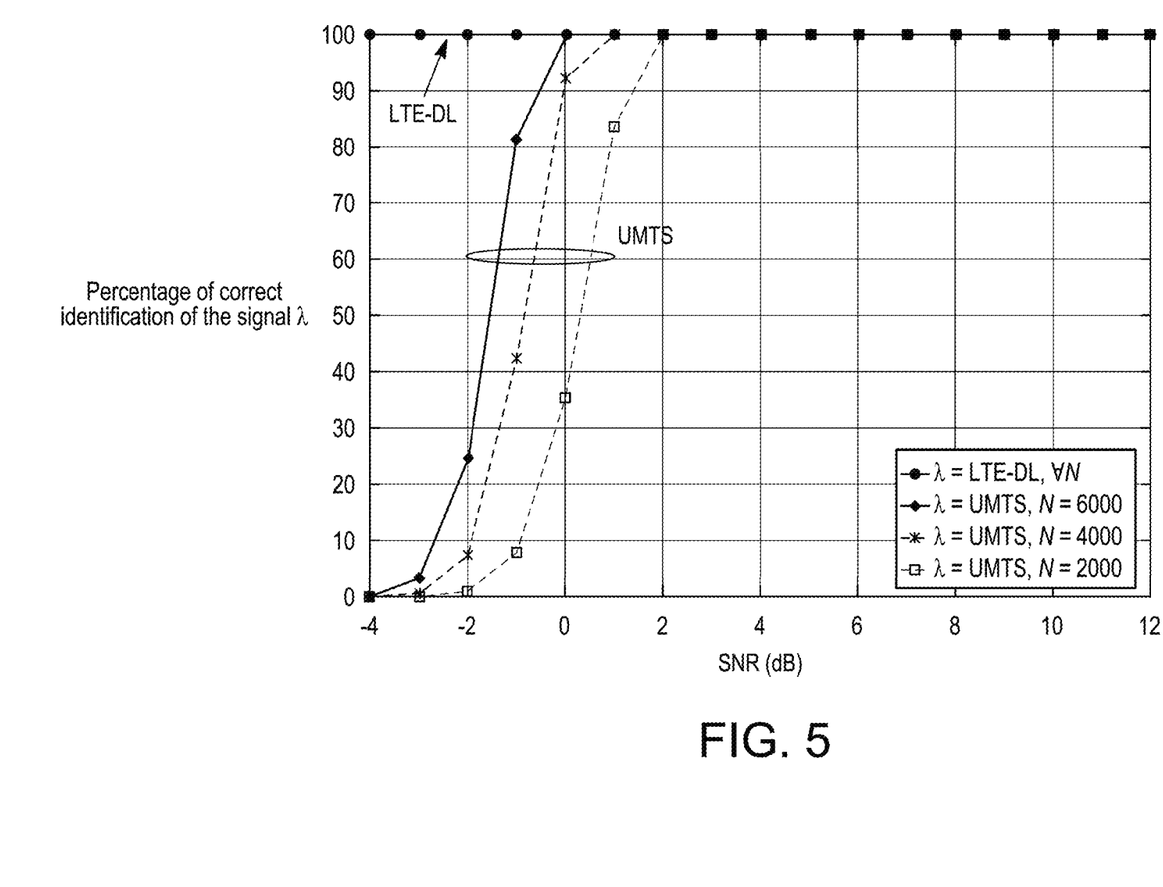
FIG. 5 shows the effect of the number of captured samples, N, on the percentage of correct identification for LTE-DL and UMTS signals.

FIG. 5 shows the effect of the number of captured samples, N, on the identification for $\Theta_1$ over AWGN channel. Note that for $\Theta_1$, the one-sample K-S test (Stage 1 in FIG. 1) is applied to identify the LTE-DL signal versus the UMTS signal. Clearly, the proposed identification method provides perfect identification for the LTE-DL signal regardless of the SNR level. This can be explained, as the Gaussian noise does not affect the distribution of the LTE-DL signal, and the identification feature still exists regardless of the SNR value. On the other hand, identification of the UMTS signal enhances by increasing N and perfect identification can be achieved with N=6000 at SNR=0 dB.

Figure 6:
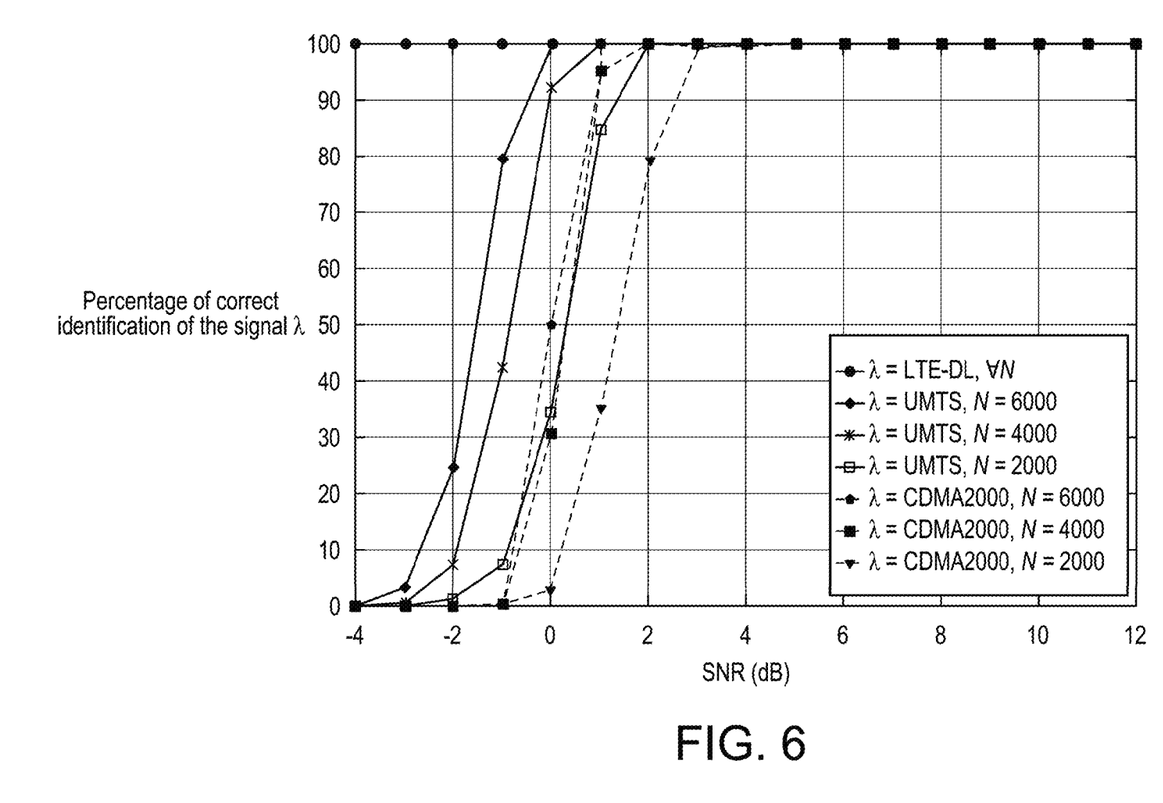
FIG. 6. shows the effect of the number of captured samples, N, on the percentage of correct identification for LTE-DL, UMTS and CDMA2000 signals.

For $\Theta_2$, the identification process relies on the one-sample K-S test (Stage 1) and bandwidth estimation (Stage 4). FIG. 6 shows the identification performance of $\Theta_2$ with different number of captured samples, i.e., N=2000, 4000, 6000, over AWGN channel. As previously noticed, perfect identification of the LTE-DL signal is obtained regardless of the SNR. For the UMTS and CDMA2000 signals, the proposed identification method works perfectly at SNR=4 dB with N=2000, while perfect identification is attained with N=4000 at SNR=2. With N=6000, the UMTS and CDMA2000 signals are identified perfectly at SNR=0 dB and SNR=2 dB, respectively.

Figure 7:
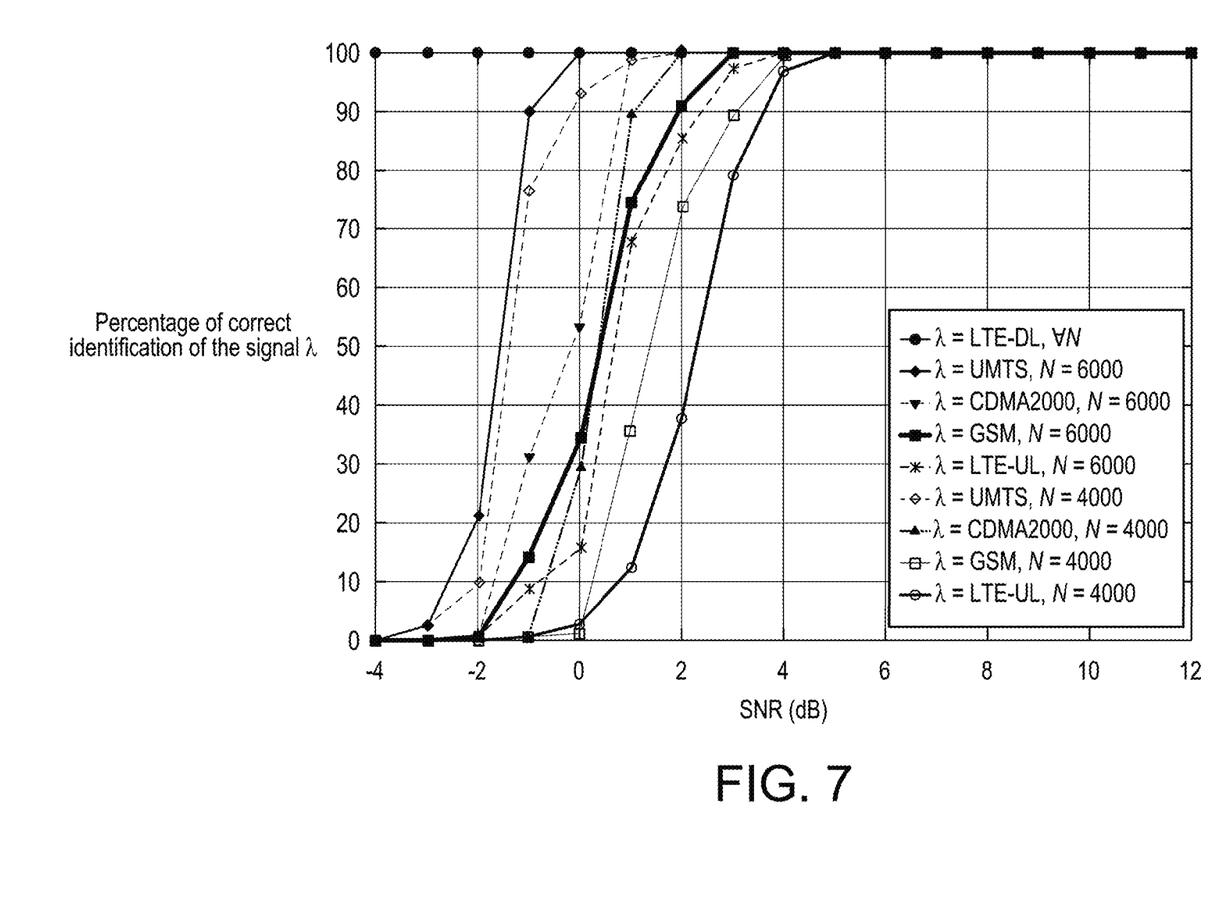
FIG. 7 shows the effect of the number of captured samples, N, on the percentage of correct identification for LTE-DL, UMTS, CDMA2000, GSM and LTE-UL signals.

FIG. 7 shows the identification performance of $\Theta_3$, over AWGN channel with N=4000 and N=6000. As expected, the identification performance of the LTE-DL signals does not depend on SNR. On the other hand, the LTE-UL signal has the lowest performance as the discriminating peak, $|R_c(\tau_p)|$ is highly affected by the noise level and does not exist at low SNRs. Overall, a perfect identification performance is achieved for all candidate cellular networks with N=4000 and N=6000 at SNR≥5 dB and SNR≥4 dB, respectively.

Performance Comparison

Table I compares the identification performance of the proposed method with the techniques used the prior art references identified below with N=4000 over AWGN channel at SNR=2 dB. As can be noticed, the proposed identification method outperforms the three techniques. Such identification features require a large number of samples to achieve good identification performance. This performance highlights the advantage of the method of the invention in providing a good identification performance with a short observation interval.

TABLE I

PERCENTAGE OF CORRECT IDENTIFICATION OF THE SIGNAL λ FOR THE PROPOSED METHOD AND THE TECHNIQUES IN [1]-[3] WITH N = 4000 OVER AWGN CHANNEL AT SNR = 2 dB

|  | λ = GSM | λ = LTE-DL | λ = CDMA2000 |
| --- | --- | --- | --- |
| Proposed algorithm | 100 | 100 | 100 |
| Algorithm in [1] | 2.12 | 8.12 | — |
| Algorithm in [2] | 4.89 | 3.12 | 5.13 |
| Algorithm in [3] | 52.3 | — | 100 |

[1] E. Karami, O. A. Dobre, and N. Adnani, "Identification of GSM and LTE signals using their second-order cyclostationarity," in *Proc. IEEE IMTC*, May 2015, pp. 1108-1112.
[2] M. Öner and F. Jondral, "Cyclostationarity based air interface recognition for software radio systems," in *Proc. IEEE RWC*, September 2004, pp. 263-266.
[3] B. Liu and K. C. Ho, "Identification of CDMA signal and GSM signal using the wavelet transform," in *Proc. IEEE MSCS*, vol. 2. August 1999, pp. 678-681.

Method Validation Under Fading Channels

In this section, we present the effect of the ITU-R vehicular A fading channel on the identification performance of the proposed method. In this scenario, the decision on the present cellular network is made based on $N_B$ noncontiguous observation intervals, which exhibit independent fading conditions, and N samples are captured during each interval.

Figure 8:
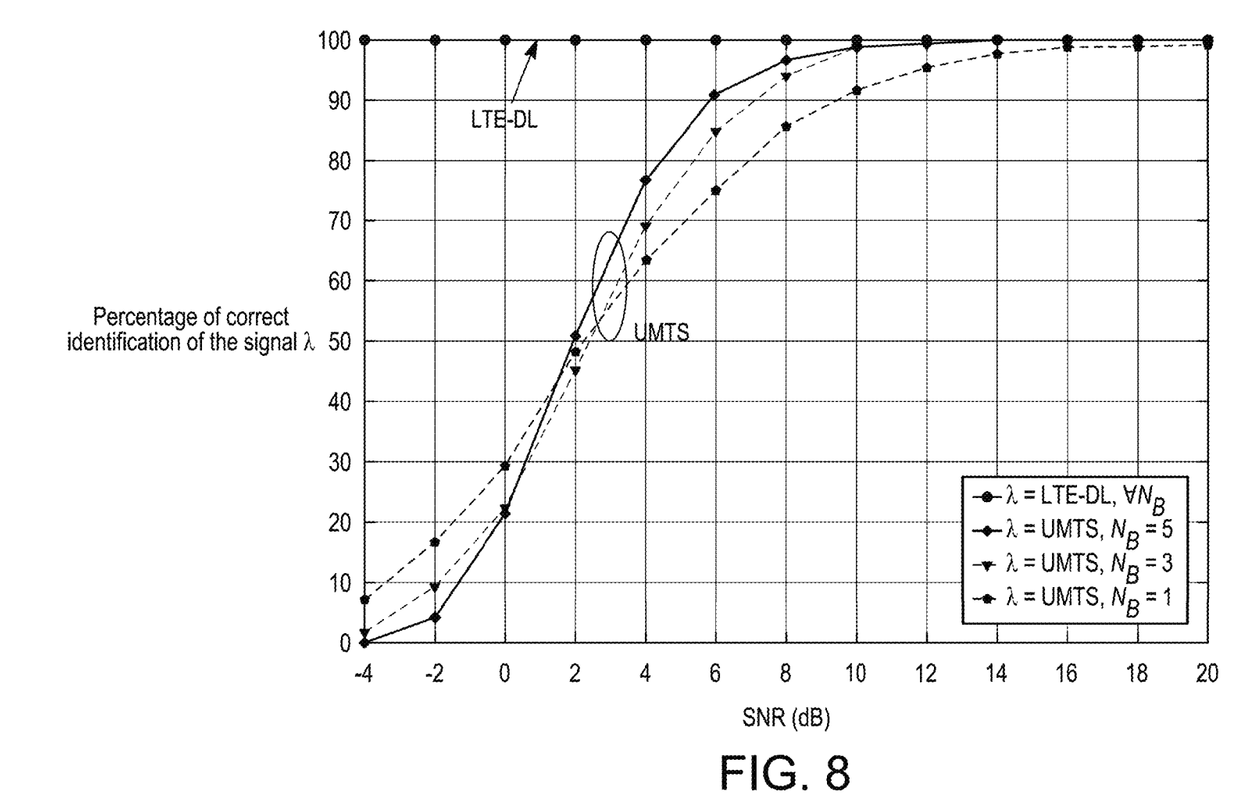
FIG. 8 shows the effect of the number of observed intervals, $N_B$, on the percentage of correct identification for LTE-DL and UMTS signals under a fading channel.

FIG. 8 shows the effect of the number of observed intervals on the percentage of correct identification for $\Theta_1$ under ITU-R vehicular A fading channel. Each observed interval contains N=2000 samples. As previously mentioned, perfect identification of the LTE-DL signal is obtained regardless of the number of observed intervals. On the other hand, the identification performance of the UMTS signal enhances as $N_B$ increases. This is because the fading channel can have a destructive effect on the identification feature, which is reduced using different intervals with independent channel parameters.

Figure 9:
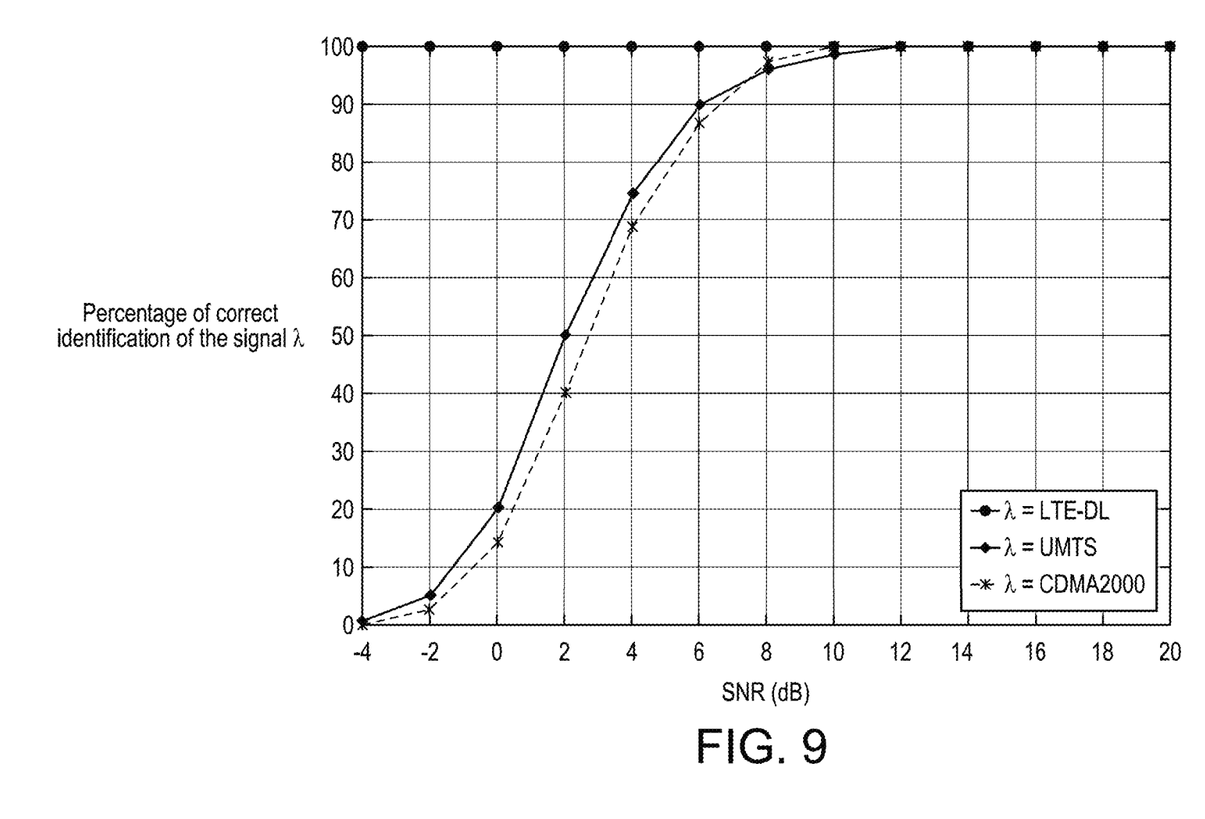
FIG. 9 shows the percentage of correct identification for LTE-DL, UMTS and CDMA2000 signals under a fading channel.
Figure 10:
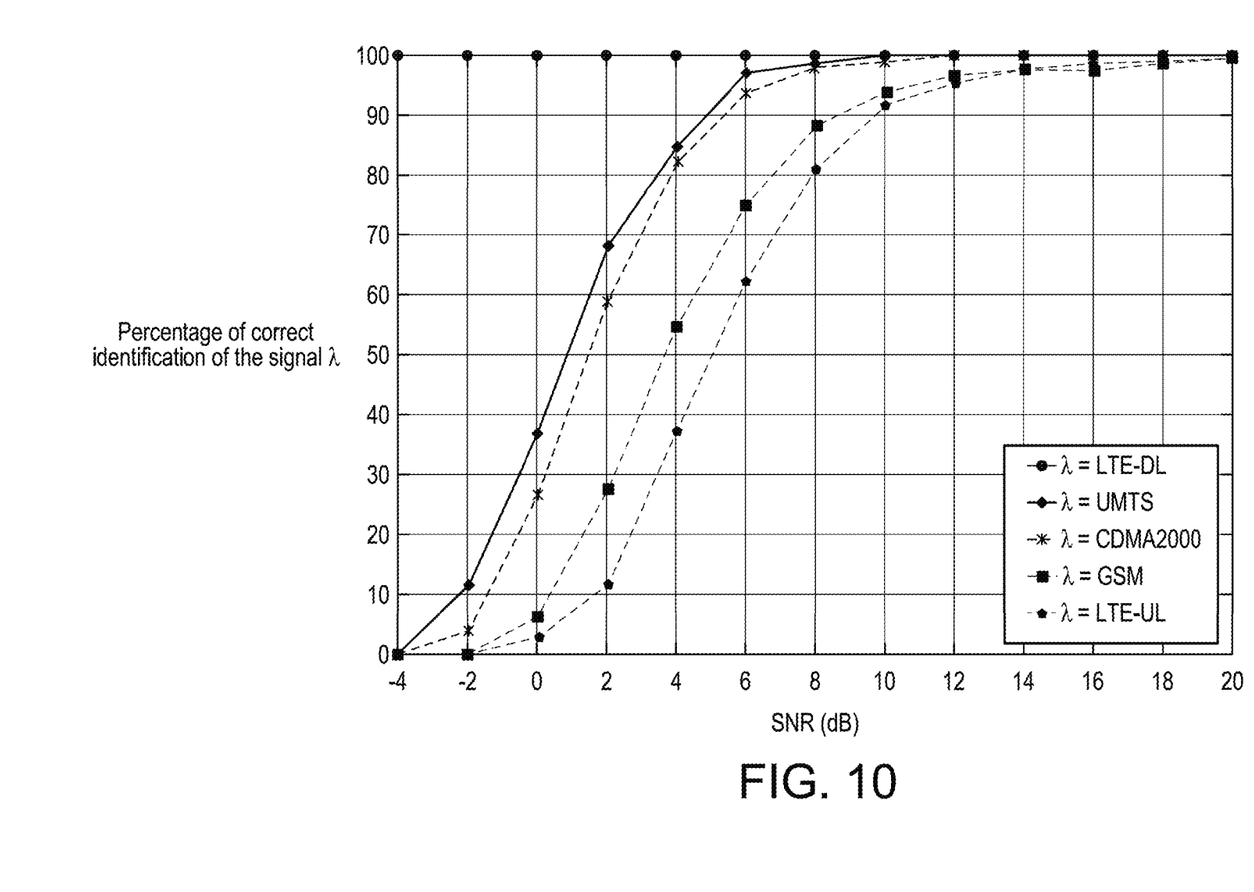
FIG. 10 shows the percentage of correct identification for LTE-DL, UMTS, CDMA2000, GSM and LTE-UL signals s fading channel.

FIG. 9 shows the percentage of correct identification for $\Theta_2$ under ITU-R vehicular A fading channel with $N_B$=5 and N=2000. The proposed method provides perfect identification performance at SNR=10 dB. It is worth mentioning that, as previously presented for other cases, better performance can be achieved by increasing the number of observation intervals. The percentage of correct identification for $\Theta_3$ under ITU-R vehicular A fading channel with $N_B$=5 and N=4000 is shown in FIG. 10. One can notice that better performance is obtained for the UMTS and CDMA2000 signals when compared with the GSM and LTE-UL signals.

In conclusion, the proposed identification method relies on the signal CDF and the K-S test to identify the GSM and LTE-DL signals. Furthermore, the presence of the CP in LTE-UL signal is exploited as an identification feature. Finally, the bandwidth measurement is employed to identify the UMTS versus CDMA2000 signals. The identification method is evaluated using standard signals generated and acquired by an R&S vector signal generator and spectrum analyzer, respectively. Experimental results verify the validity of the method with short observation intervals under AWGN and ITU-R vehicular A channels. Moreover, the method of the invention is robust to timing and frequency offsets.

Various alternatives and variations to the invention are contemplated, particularly in respect of the decision tree, order of and determination made to distinguish between types of signals. One such variation is shown in FIG. 11.

Figure 11:
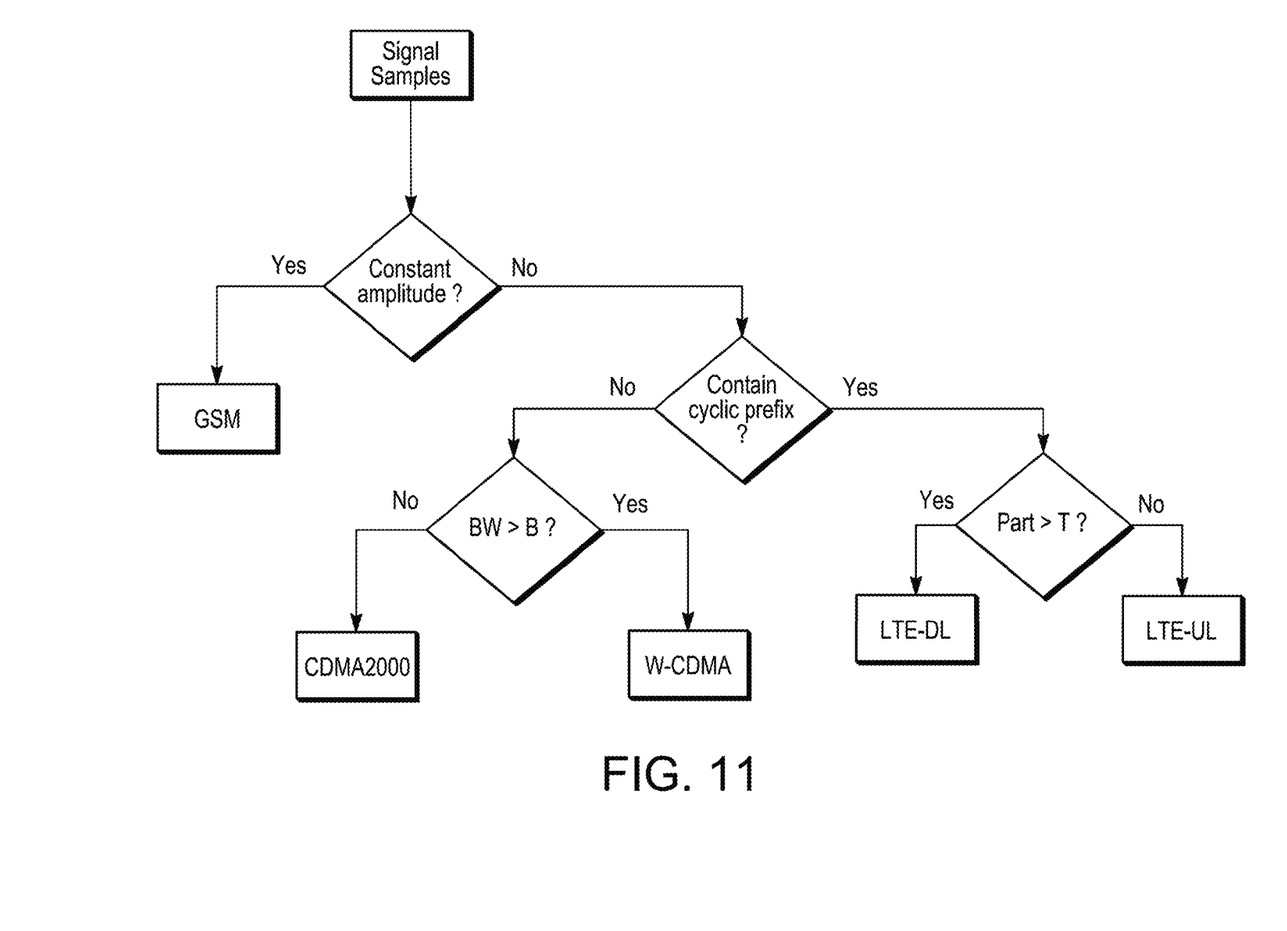
FIG. 11 shows an alternative embodiment of the method of FIG. 1.

FIG. 11 shows a decision tree of an alternative embodiment of the invention. In this implementation, the first stage is to check if the signal has constant amplitude. This check can be performed using features described above. Because only GSM signals have constant amplitude among all cellular network signals, the first stage allows discrimination between GSM vs other cellular signals.

The second stage is to further discriminate between other cellular signals. LTE is the only cellular network standard that uses OFDM modulation, which relies on cyclic prefix to ease channel estimation. The test for the existence of cyclic prefix can discriminate between LTE vs other cellular signals. This check can be performed using, for example, a second order correlation algorithm used in the first embodiment of this invention.

In a successive stage of the decision tree, uplink vs downlink identification of the LTE network can be performed. The LTE downlink uses OFDMA scheme to ease resource allocation which generates large peak-to-average power ratio (PAPR) signals; whereas low PAPR SC-FDMA technique is used in the uplink to use hand-set battery more efficiently. In this embodiment of the system, PAPR of the received signal can be used to discriminate between LTE-UL and LTE-DL.

At the last stage of the decision tree, CDMA2000 vs W-CDMA discrimination is performed based on the bandwidth distinction of these two systems.

The invention claimed is:

1. A method for identifying cellular networks using a computer processor and a signal receiver comprising:
   (i) applying a signal magnitude test to determine whether magnitude of observed cellular signal samples follows a predetermined distribution representative of LTE-DL (long term evolution downlink) signals;
   upon a condition in which said observed samples follows said predetermined distribution, outputting an indication that a signal is from an LTE-DL network and terminating the method;
   (ii) applying a test to determine the presence of a cyclic prefix;
   upon a condition in which the presence of the cyclic prefix is detected, outputting an indication that said signal is from an LTE-UL (long term evolution uplink) network, and terminating the method;
   (iii) applying a test to determine whether the signal samples have a constant envelope;
   upon a condition in which said signal samples have a constant envelope, outputting an indication that said signal is from a GSM network, and terminating the method;
   (iv) applying a test to determine a signal bandwidth estimate to determine whether said signal samples are from CDMA2000 (code-division multiple access) or UMTS (universal mobile telecommunications system) networks; and outputting an indication of either the CDMA2000 or UMTS networks
   wherein the observed cellular signal samples are received by a single receive antenna and are of the form $y_n = x_n + w_n$, n=0, 1, ..., N−1, where $x_n$ represents the transmitted signal which belongs to either LTE-DL, GSM, LTE-UL, UMTS, or CDMA2000 networks, N is the number of observed samples, and $w_n$ is the complex additive white Gaussian noise (AWGN) with zero-mean and variance $\sigma_w^2$.

2. The method of claim 1, wherein the magnitude test is a Kolmogorov-Smirnov test, and wherein the predetermined distribution is a Rayleigh distribution.

3. The method of claim 1, wherein said test to determine the presence of a cyclic prefix is a second-order one-conjugate correlation test.

4. The method of claim 1, wherein said test to determine whether the signal samples have a constant envelope is a one-sample Kolmogorov-Smirnov test.

5. The method of claim 1, wherein a bandwidth of 1.25 MHz is used to indicate the CDMA2000 network and a bandwidth of 5 MHz is used to indicate the UMTS network.

6. A method for identifying cellular networks using a computer processor and a signal receiver comprising:
   (i) applying a test to determine whether observed cellular signal samples have a constant amplitude;
   upon a condition in which said observed samples have a constant amplitude, outputting an indication that a signal is from a GSM network;
   (ii) applying a test to determine the presence of a cyclic prefix;
   upon a condition in which the presence of the cyclic prefix is detected, determining a peak to average power ratio of the signal; wherein a high peak to average power ratio is indicative of an LTE-DL signal and a low peak to average power ratio is indicative of an LTE-UL signal; and outputting a corresponding indication of either the signal is from either an LTE-DL or LTE-UL network;

(iii) applying a test to determine a signal bandwidth estimate to determine whether said signal samples are from CDMA2000 (code-division multiple access) or W-CDMA networks; and outputting an indication of either the CDMA2000 or W-CDMA networks wherein the observed cellular signal samples are received by a single receive antenna and are of the form $y_n = x_n + w_n$, $n=0, 1, \ldots, N-1$, where $x_n$ represents the transmitted signal which belongs to either LTE-DL, GSM, LTE-UL, UMTS, or CDMA2000 networks, N is the number of observed samples, and $w_n$ is the complex additive white Gaussian noise (AWGN) with zero-mean and variance $\sigma_w^2$.

* * * * *